(12) United States Patent
Zhang et al.

(10) Patent No.: US 10,154,454 B2
(45) Date of Patent: Dec. 11, 2018

(54) CELL SELECTION AND RESELECTION FOR LOW COST MACHINE-TYPE COMMUNICATION UE

(71) Applicant: MEDIATEK Singapore Pte. Ltd., Singapore (SG)

(72) Inventors: Yuanyuan Zhang, Beijing (CN); Per Johan Mikael Johansson, Kungsangen (SE)

(73) Assignee: MEDIATEK Singapore Pte. Ltd., Singapore (SG)

( * ) Notice: Subject to any disclaimer, the term of this patent is extended or adjusted under 35 U.S.C. 154(b) by 69 days.

(21) Appl. No.: 15/232,277

(22) Filed: Aug. 9, 2016

(65) Prior Publication Data

US 2016/0353371 A1    Dec. 1, 2016

Related U.S. Application Data

(63) Continuation of application No. PCT/CN2015/074811, filed on Mar. 20, 2015.

(30) Foreign Application Priority Data

Mar. 21, 2014 (CN) .......................... 2014 1 0108495

(51) Int. Cl.
*H04W 48/20* (2009.01)
*H04W 76/27* (2018.01)
(Continued)

(52) U.S. Cl.
CPC ....... *H04W 48/20* (2013.01); *H04W 36/0061* (2013.01); *H04W 48/06* (2013.01);
(Continued)

(58) Field of Classification Search
CPC . H04W 48/02; H04W 48/20; H04W 36/0061; H04W 48/08; H04W 76/046;
(Continued)

(56) References Cited

U.S. PATENT DOCUMENTS

2011/0270984 A1   11/2011   Park .............................. 709/225
2013/0083753 A1*   4/2013   Lee ................... H04W 72/0453
                                                                          370/329

(Continued)

FOREIGN PATENT DOCUMENTS

CN       101807472 A    12/2007
CN       101631352 A     1/2010
(Continued)

OTHER PUBLICATIONS

CATT, "Discussion on new UE category/type for low cost MTC UE for LTE", Aug. 23, 2013, 3GPP, R1-133017.*

(Continued)

*Primary Examiner* — Paul H Masur
*Assistant Examiner* — Michael K Phillips
(74) *Attorney, Agent, or Firm* — Imperium Patent Works; Helen Mao (57) ABSTRACT

Methods and apparatus are provided for low cost machine communication type (LC-MTC) devices for cell selection and cell reselection. In one novel aspect, the LC-MTC UE determines whether the cell is capable of supporting LC-MTC. If the LC-MTC UE determines that LC-MTC is not supported by the cell, the LC-MTC UE considers the cell as barred. The LC-MTC support capability information is provided to the LC-MTC UE in the system information, or in the RRC Connection Release message, or by inheriting from another RAT during the inter-RAT cell (re)selection. The LC-MTC support capability information is indicated per cell or per frequency. In another novel aspect, the LC-MTC UE acquires LC-MTC support capability information of neighbor cells and performs cell reselection based on the LC-MTC support capability information. In one embodiment, the LC-MTC support capability information of neigh- (Continued)

bor cells is provided in the system information of the serving cell.

19 Claims, 5 Drawing Sheets

(51) Int. Cl.
| | |
|---|---|
| *H04W 36/00* | (2009.01) |
| *H04W 48/08* | (2009.01) |
| *H04W 48/10* | (2009.01) |
| *H04W 48/12* | (2009.01) |
| *H04W 48/06* | (2009.01) |
| *H04W 4/70* | (2018.01) |
| *H04W 48/02* | (2009.01) |

(52) U.S. Cl.
CPC .......... *H04W 48/08* (2013.01); *H04W 48/10* (2013.01); *H04W 48/12* (2013.01); *H04W 76/27* (2018.02); *H04W 4/70* (2018.02); *H04W 48/02* (2013.01)

(58) Field of Classification Search
CPC ..... H04W 48/12; H04W 4/005; H04W 48/06; H04W 48/10; H04W 36/0083; H04W 72/04; H04W 88/02; H04W 88/08; H04W 8/22; H04W 48/16; H04W 76/27; H04W 4/70
See application file for complete search history.

(56) References Cited

U.S. PATENT DOCUMENTS

| | | | |
|---|---|---|---|
| 2013/0121309 A1* | 5/2013 | Guo | H04W 4/005 370/331 |
| 2013/0150050 A1* | 6/2013 | Ueda | H04W 48/04 455/436 |
| 2013/0343319 A1 | 12/2013 | Quan et al. | 370/329 |
| 2014/0064067 A1* | 3/2014 | Drewes | H04L 5/0044 370/230 |
| 2014/0120936 A1* | 5/2014 | Chen | H04W 48/06 455/452.1 |
| 2014/0148169 A1* | 5/2014 | Li | H04W 36/0061 455/437 |
| 2014/0314048 A1 | 10/2014 | Yi et al. | 370/332 |
| 2016/0165497 A1* | 6/2016 | Tokunaga | H04W 36/0072 455/437 |
| 2016/0205495 A1* | 7/2016 | Hu | H04W 48/18 370/331 |
| 2016/0353342 A1* | 12/2016 | Futaki | H04W 4/005 |
| 2016/0353440 A1* | 12/2016 | Lee | H04W 4/70 |

FOREIGN PATENT DOCUMENTS

| | | |
|---|---|---|
| CN | 101646223 A | 2/2010 |
| CN | 102118833 A | 7/2011 |
| EP | 2592873 A1 | 5/2013 |
| EP | 2683201 A1 | 1/2014 |
| WO | WO2013115571 A1 | 8/2013 |

OTHER PUBLICATIONS

EPO, Search Report for the EP patent application 15765580.4 dated Dec. 13, 2016 (10 pages).
3GPP TSG-RAN WG2 #85 R2-140277, Huawei et al., RAN2 Impacts of Low Cost MTC, Prague, Czech Republic, Feb. 14, 2014 (4 pages).
International Search Report and Written Opinion of International Search Authority for PCT/CN2015/074811 dated Jul. 1, 2015 (12 pages).
EPO, Search Report for the EP patent application 17192097.8 dated Mar. 15, 2018 (21 pages).
3GPP TSG-RAN2 #85bis Meeting R2-141439, Mediatek Inc., Cell Selection and Reselection for LC-MTC UE, Valencia, Spain, Mar. 31-Apr. 4, 2014 (2 pages).
3GPP TSG-RAN WG2 Meeting #86 R2-142298, Mediatek Inc. et al., Cell Reselection for Low Cost MTC UE, Seoul, Korea, May 19-23, 2014 (3 pages).
3GPP TSG-RAN WG2 Meeting #85bis R2-141094, Huawei et al., Cell Reselection for Low Cost MTC UEs, Valencia, Spain, Mar. 31-Apr. 4, 2014 (2 pages).

* cited by examiner

CELL SELECTION AND RESELECTION FOR LOW COST MACHINE-TYPE COMMUNICATION UE

CROSS REFERENCE TO RELATED APPLICATIONS

This application is filed under 35 U.S.C. § 111(a) and is based on and hereby claims priority under 35 U.S.C. § 120 and § 365(c) from International Application No. PCT/CN2015/074811, with an international filing date of Mar. 20, 2015, which in turn claims priority from Chinese application 201410108495.x filed on Mar. 21, 2014. This application is a continuation of International Application No. PCT/CN2015/074811, which claims priority from Chinese application 201410108495.x. International Application No. PCT/CN2015/074811 is pending as of the filing date of this application, and the United States is a designated state in International Application No. PCT/CN2015/074811. This application claims priority under 35 U.S.C. § 120 and § 365(c) from Chinese application 201410108495.x filed on Mar. 21, 2014. The disclosure of each of the foregoing documents is incorporated herein by reference.

TECHNICAL FIELD

The disclosed embodiments relate generally to Machine type communications, and, more particularly, to cell selection and reselection for low cost MTC UE.

BACKGROUND

Machine-Type Communication (MTC) is an important revenue stream for operators and has a huge potential from the operator perspective. Lowering the cost of MTC user equipment (UEs)/devices is an important enabler for the implementation of the concept of "internet of things" (IOT). Many MTC devices are targeting low-end (low average revenue per user, low data rate) applications that can be handled adequately by GSM/GPRS. Owing to the low-cost of these devices and good coverage of GSM/GPRS, there is very little motivation for MTC UE suppliers to use modules supporting the LTE radio interface. In order to ensure that there is a clear business benefit to MTC UE vendors and operators for migrating low-end MTC devices from GSM/GPRS to LTE networks, a new type of terminal, i.e. low cost (LC) MTC UE, is introduced in Rel-11. The cost of the LC-MTC UEs is tailored for the low-end of the MTC market to be competitive with that of GSM/GPRS terminals. The low cost MTC device/UE is characterized by:

One Rx antenna;
Downlink and uplink maximum TBS size of 1000 bits;
Reduced downlink channel bandwidth of 1.4 MHz for data channel in baseband, while the control channels are still allowed to use the carrier bandwidth. Uplink channel bandwidth and bandwidth for uplink and downlink RF remain the same as that of normal LTE UE.

In order to serve the low-cost (LC) MTC UE, the network capable of supporting LC-MTC UE needs to schedule both common channels and dedicated channels with the restriction of both TBS size and narrow bandwidth. Different from the legacy UE, if the low-cost MTC UE is not aware of network's capability, one risk is that the LC-MTC UE cannot acquire all the system information. If it camps on a cell incapable of supporting LC-MTC, it may keep trying to acquire the system information. Another risk is that a LC-MTC UE acquires system information with restricted TBS and bandwidth in a cell incapable of supporting LC-MTC, e.g. the system information is transmitted within the reduced bandwidth of 6 PRBs by coincident. Then the LC-MTC UE will perform random access procedure to access the network but cannot receive the random access response from the cell, which is scheduled beyond the LC-MTC UE's capability. As a result, the LC-MTC UE will keep trying to access the network.

In order to prevent the LC-MTC UE from accessing the network that is incapable of supporting LC-MTC, eNB needs to indicate whether it supports low-cost or not in the system information. For example, a LC-MTC UE may access a cell only if SIB1 indicates that access of low cost MTC UEs is allowed. In the current invention, the cell selection and cell reselection procedures for LC-MTC UE considering the network's capability is described.

SUMMARY

Methods and apparatus are provided for low cost machine communication type (LC-MTC) devices for cell selection and cell reselection. In one novel aspect, the LC-MTC UE determines whether the cell is capable of supporting LC-MTC. If the LC-MTC UE determines that LC-MTC is not supported by the cell, the LC-MTC UE considers the cell as barred. Otherwise, the LC-MTC UE does not consider the cell as barred. The LC-MTC UE acquires the capability information of a cell, checks the LC-MTC support capability of the cell, and determines the accessibility of the cell. In one embodiment, the LC-MTC support capability information is provided to the LC-MTC UE in the system information. In another embodiment, the LC-MTC support capability information is provided to the LC-MTC UE in the RRC Connection Release message. In yet another embodiment, the LC-MTC support capability information is provided to the LC-MTC UE by inheriting from another RAT during the inter-RAT cell selection/reselection. In one embodiment, the LC-MTC support capability information is indicated per cell. In one embodiment, the LC-MTC support capability information is indicated per frequency. In one embodiment, on transitioning from the RRC_CONNECTED state to RRC_IDLE state the LC-MTC UE attempts to camp on a suitable cell according to the redirectedCarrierInfo in the received RRC Connection Release message. If the redirectedCarrierInfo is included and the frequency indicated in the redirectedCarrierInfo is capable of supporting LC-MTC, the LC-MTC UE selects a cell with the indicated frequency. If the redirectedCarrierInfo is not included, the UE should select a EUTRA carrier frequency that supports LC-MTC. Otherwise, the LC-MTC UE performs a Stored Information Cell Selection procedure. In one embodiment, the stored information includes the carrier frequency as well as the parameter related to the capability of supporting LC-MTC for each carrier frequency.

In another novel aspect, the LC-MTC UE acquires LC-MTC support capability information of neighbor cells and performs cell reselection based on the LC-MTC support capability information. The LC-MTC UE acquires the capability information of supporting LC-MTC for the neighboring cells, selects the neighboring cells that are capable of supporting LC-MTC, performs measurements of the selected neighboring cells, and executes the cell-reselection evaluation process. In one embodiment, the LC-MTC support capability information is provided in the system information of the serving cell. The neighbor cell LC-MTC support capability information is per cell or per frequency.

In another embodiment, before performing measurements of the neighboring cell, the LC-MTC UE selects the frequencies capable of supporting LC-MTC and handles the reselection priorities for the selected frequencies.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Machine type communication is a form of data communication that involves one or more entities that do not necessarily need human interaction. A service optimized for machine type communication differs from a service optimized for human-to-human (H2H) communication. Typically, MTC services are different to current mobile network communication services because MTC services involve different market scenarios, pure data communication, lower cost and effort, and a potentially very large number of communicating terminals with little traffic per terminal. Therefore, it is important to distinguish LC-MTC from regular UEs. It is beneficial for LC-MTC devices/UEs to camp on and connect to eNBs that support the LC-MTC features. Apparatus and methods are provided and described in details to support such functionalities.

Figure 1:
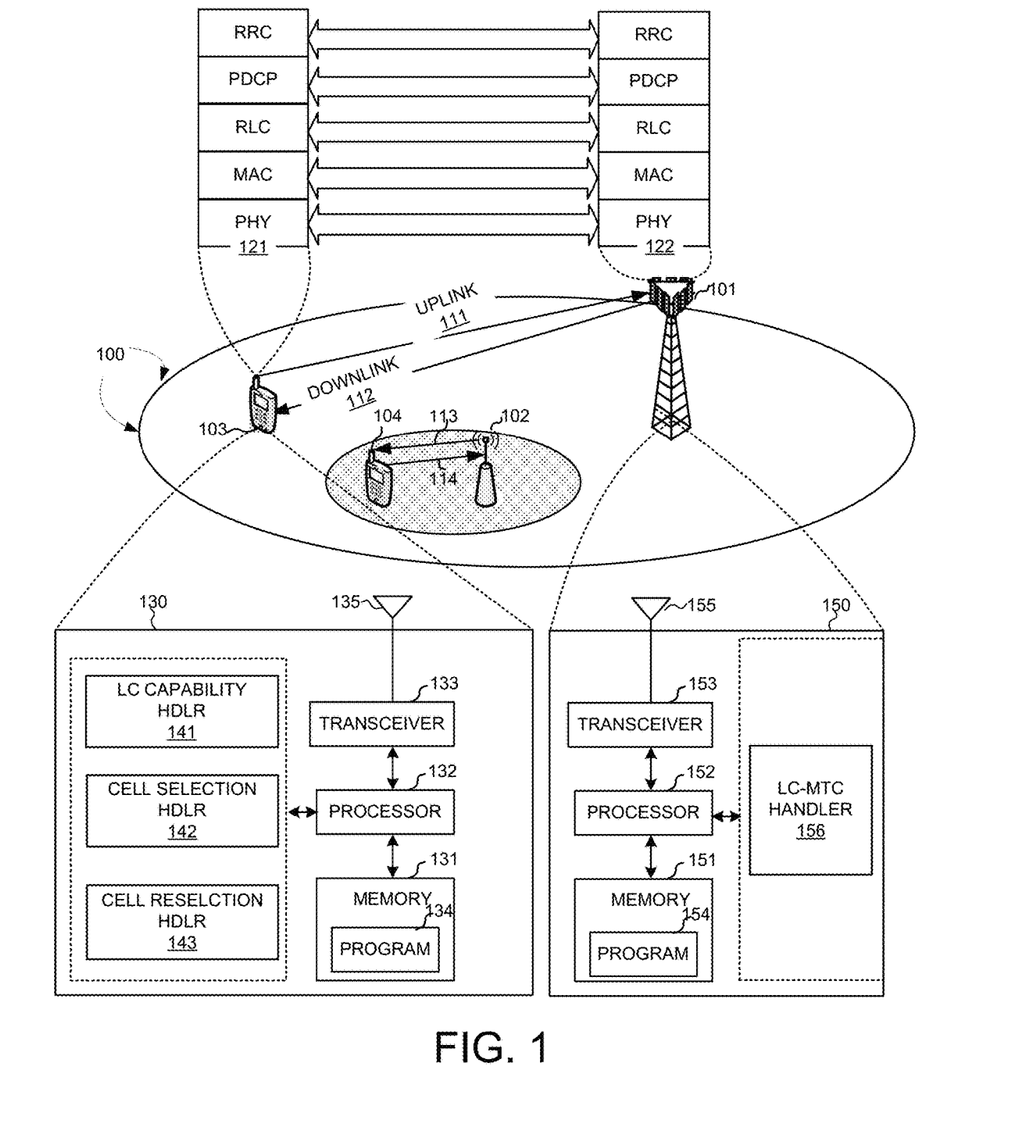
FIG. 1 illustrates an exemplary mobile communication network with low cost MTC UEs in accordance with embodiments of the current invention.

FIG. 1 illustrates an exemplary mobile communication network 100 with low cost MTC UEs in accordance with embodiments of the current invention. Wireless communication system 100 includes one or more fixed base infrastructure units forming a network distributed over a geographical region. The base unit may also be referred to as an access point, an access terminal, a base station, a Node-B, an eNode-B (eNB), or by other terminology used in the art. In FIG. 1, the one or more base stations 101 and 102 serve a number of MTC UEs 103 and 104 within a serving area, for example, a cell, or within a cell sector. In one embodiment, MTC UEs 103 and/or 104 are regular UEs that are configured to be MTC UEs. In another embodiment, regular UEs can be configured to be low cost UEs. A LC-MTC can be configured from a regular UE, a MTC UE or any other type of UE. The LC-MTC UE can be configured locally on the UE or dynamically configured through network signaling. In some systems, one or more base stations are communicably coupled to a controller forming an access network that is communicably coupled to one or more core networks. The disclosure, however, is not intended to be limited to any particular wireless communication system.

Generally, serving base stations 101 and 102 transmit downlink communication signals 112 and 113 to LC-MTC UEs in the time and/or frequency domain. MTC UEs 103 and 104 communicate with one or more base units 101 and 102 via uplink communication signals 111 and 114. UE or the mobile station may also be referred to a mobile phone, laptop, and mobile workstation and so on. In FIG. 1, the mobile communication network 100 is an OFDM/OFDMA system comprising a base station eNB 101 eNB 102 and a plurality of MTC UE 103 and MTC UE 104. When there is a downlink packet to be sent from the eNB to the LC-MTC UE, each LC-MTC UE gets a downlink assignment, e.g., a set of radio resources in a physical downlink shared channel (PDSCH). When a LC-MTC UE needs to send a packet to eNB in the uplink, the LC-MTC UE gets a grant from the eNB that assigns a physical downlink uplink shared channel (PUSCH) consisting of a set of uplink radio resources. The LC-MTC UE gets the downlink or uplink scheduling information from a physical downlink control channel (PDCCH) or an enhanced physical downlink control channel (EPDCCH) that is targeted specifically to that LC-MTC UE. The downlink or uplink scheduling information and the other control information, carried by PDCCH, is referred to as downlink control information (DCI).

FIG. 1 also shows an exemplary diagram of protocol stacks for control-plane for MTC UE 103 and eNB 101. MTC UE 103 has a protocol stack 121, which includes the physical (PHY) layer, the medium access control (MAC) layer, the radio link control (RLC) layer, the pack data convergence protocol (PDCP) layer, and the radio resource control (RRC) layer. Similarly, eNB 101 has a protocol stack 122. Protocol stack 122 connects with protocol stack 121. The UE-eNB protocol stack 122 includes the PHY layer, the MAC layer, the RLC layer the PDCP layer and the RRC layer, each of which connects with their corresponding protocol stack of UE protocol stack 121.

FIG. 1 further illustrates simplified block diagrams 130 and 150 for MTC UE 103 and eNB 101, respectively. MTC UE 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in MTC UE 103. Memory 131 stores program instructions and data 134 to control the operations of LC-MTC UE 103.

MTC UE 103 also includes multiple function modules that carry out different tasks in accordance with embodiments of the current invention. A low-cost capacity handler/ module 141 acquires capability information, wherein the capability information associates with a cell in the wireless network, checks a LC-MTC support capability of the cell based on the acquired capability information, and determines an accessibility of the cell based on the LC-MTC support capability of the cell. A cell selection handler/module 142 selects a cell to camp on based on cell accessibilities of one or more cells determined by the LC capability module. A cell reselection handler/module 143 acquires capability information of neighboring cells, wherein each capability information indicates a LC-MTC support capability of each corresponding cell, selects one or more cells based on the LC-MTC support capability of each cell, wherein the selected cells indicates support capability for LC-MTC, performs measurements on the selected cells, and performs a cell reselection based on the measurements.

Also shown in FIG. 1 is exemplary block diagram for eNB 101. eNB 101 has an antenna 155, which transmits and receives radio signals. A RF transceiver module 153, coupled with the antenna, receives RF signals from antenna 155, converts them to baseband signals, and sends them to processor 152. RF transceiver 153 also converts received baseband signals from processor 152, converts them to RF signals, and sends out to antenna 155. Processor 152 processes the received baseband signals and invokes different functional modules to perform features in eNB 101. Memory 151 stores program instructions and data 154 to control the operations of eNB 101. eNB 101 also includes function modules that carry out different tasks in accordance with embodiments of the current invention. A LC-MTC handler 156 performs functions to support the LC-MTC functions of the LC MTC UEs communicate with eNB 101.

During cell selection, the LC-MTC UE searches for a suitable cell of a selected PLMN and chooses that cell to provide available services, further the LC-MTC UE shall tune to its control channel. This choosing is known as "camping on the cell." If the LC-MTC UE finds a more suitable cell, according to the cell reselection criteria, it reselects onto that cell and camps on it.

There are two mechanisms, which allow an operator to impose access restrictions. The first mechanism uses indication of cell status and special reservations for control of cell selection and reselection procedures. The second mechanism, referred to as Access Control, prevents selected classes of users from sending initial access messages for load control reasons. The procedure of checking the LC-MTC support capability of the cell should be performed on top of the regular access control, which means only after the LC-MTC UE determines that the cell is capable of supporting LC-MTC, it then checks the cell status and performs access barring checking.

In one novel aspect, the LC-MTC UE determines the accessibility of cell by first checking the LC-MTC support capability. If the cell is not capable of supporting LC-MTC UE, the access to the cell is barred. Otherwise, the LC-MTC UE further checks the cell status. If the cell is indicated barred, the access to the cell is barred. Otherwise, UE camps on the cell and performing access barring checking when establishing RRC connection. If the cell is to be treated as if the cell status is barred, the access to the cell is barred. Otherwise, the cell is considered accessible or not barred.

Figure 2:
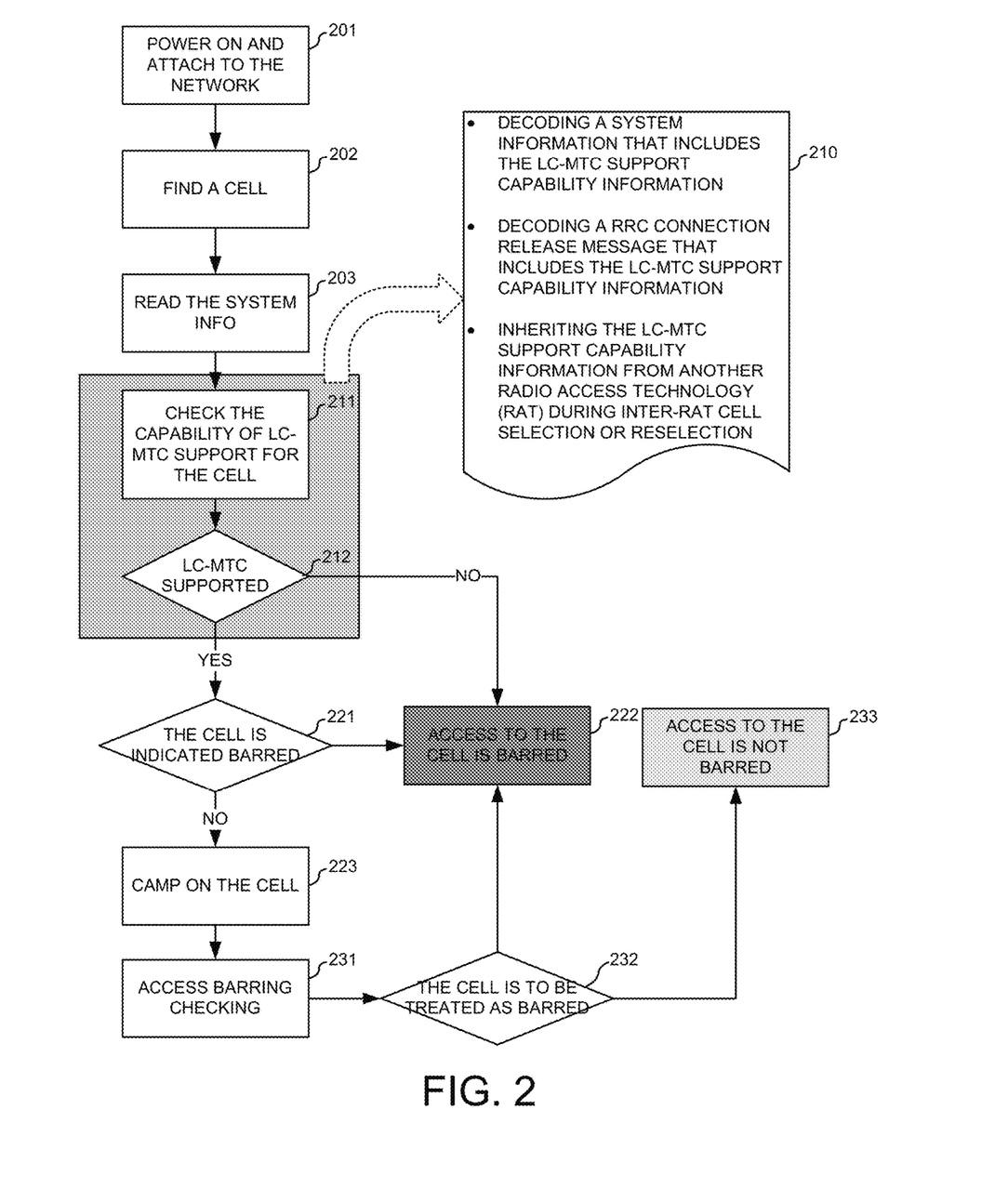
FIG. 2 is an exemplary flow diagram for LC-MTC UE to determine cell accessibilities based on LC-MTC support capability during cell selection in accordance with embodiments of the current invention.

FIG. 2 is an exemplary flow diagram for LC-MTC UE to determine cell accessibilities based on LC-MTC support capability during cell selection in accordance with embodiments of the current invention. After the LC-MTC UE powers on and attaches to the network (step 201) or transfers from RRC_CONNECT to RRC_IDLE, the LC-MTC UE performs cell (re)selection to find a cell to camps on (step 202). The LC-MTC UE reads system information (step 203). In one novel aspect, LC-MTC UE checks whether the cell is capable of supporting LC-MTC (step 211). At step 212, the LC-MTC UE checks if the LC-MTC is supported by the cell. If the cell is incapable of supporting LC-MTC, the LC-MTC UE considers the access to the cell is barred (step 222). Otherwise, the LC-MTC UE checks whether the cell is indicated as barred (step 221). If it is the case, it considers the access to the cell is barred (step 222). If step 221 determines that the cell is not indicated as barred, the LC-MTC UE camps on the cell (step 223). The LC-MTC UE performs access barring checking when establishing RRC connection (step 231). At step 232, the LC-MTC UE checks whether the cell is to be treated as barred. If step 232 determines that access barring checking fails, i.e. the cell is to be treated as if the cell status is "barred," the LC-MTC UE considers the access to the cell is barred (step 222). Otherwise, the cell is considered not barred (step 233).

FIG. 2 further shows a method set 210 that include different ways to obtain the LC-MTC support capability information. In one embodiment, the LC-MTC UE decodes a system information that includes the LC-MTC support capability information, for system information block (SIB). In another embodiment, the LC-MTC UE decodes a RRC Connection Release message (RRCconnectionrelease) that includes the LC-MTC support capability information. In yet another embodiment, the LC-MTC UE inherits the LC-MTC support capability information from another radio access technology (RAT) during inter-RAT cell selection or reselection. The capability of supporting LC-MTC can be indicated per frequency or per cell.

Figure 3:
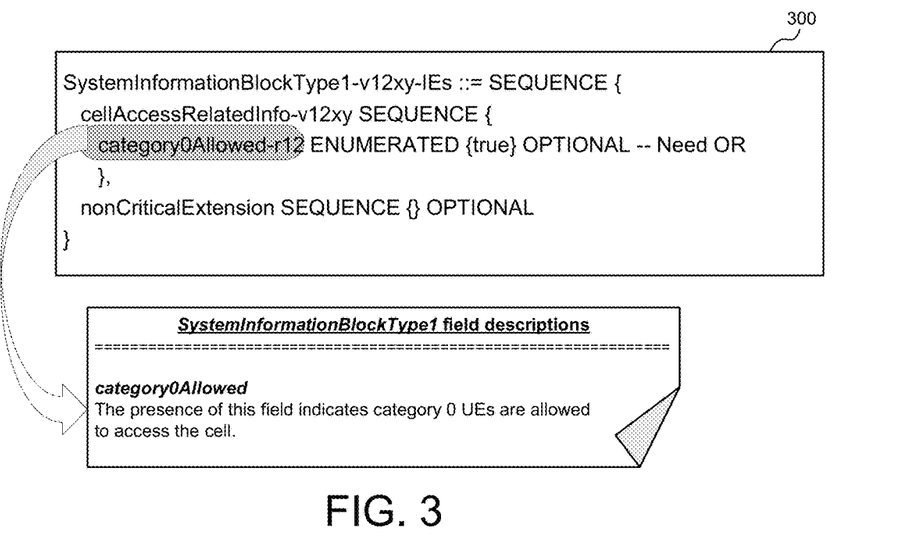
FIG. 3 illustrates one example of LC-MTC support capability information broadcasted via a system information block (SIB).

FIG. 3 illustrates one example of LC-MTC support capability information broadcasted via a system information block (SIB). Table 300 illustrates one example of system information block type-1 (SIB1). In SIB1, the cell access related information parameters include an optional category0allowed entry and an optional non-critical extension sequence. The presence of the field category0allowed indicates that category-0 UEs are allowed to access the cell. The category-0 UE is the low-cost MTC UE. Therefore, upon decoding the system information block type-1 message, the LC-MTC UE checks if the field of category0allowed is included. If the field is included, the LC-MTC UE determines that the corresponding cell supports LC-MTC UEs. If the field is not present in the SIB1 message, the LC-MTC UE determines that the corresponding cell does not support LC-MTC. The LC-MTC UE considers the corresponding cell barred.

On transition from RRC_CONNECTED to RRC_IDLE, the LC-MTC UE shall attempt to camp on a suitable cell according to redirectedCarrierInfo, if included in the RRCConnectionRelease message. The frequency indicated in redirectedCarrierInfo should be capable of supporting LC-MTC. If the UE cannot find a suitable cell, the LC-MTC UE is allowed to camp on any suitable cell of the indicated RAT, which is capable of supporting LC-MTC. If the RRCConnectionRelease message does not contain the redirectedCarrierInfo, the LC-MTC UE shall attempt to select a suitable cell on a EUTRA carrier capable of supporting LC-MTC. If no suitable cell is found according to the above, the LC-MTC UE shall perform a cell selection starting with Stored Information Cell Selection procedure in order to find a suitable cell to camp on. The stored information includes the carrier frequency as well as the parameter related to the capability of supporting LC-MTC for each carrier frequency. If no cell capable of supporting LC is found, UE performs initial cell selection procedure.

Figure 4:
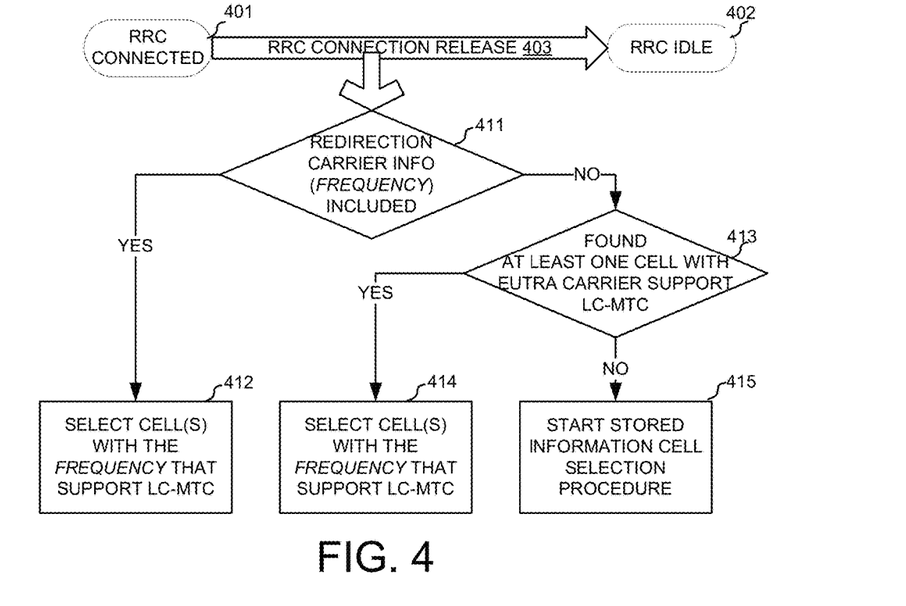
FIG. 4 is an exemplary flow diagram of performing a cell selection by a LC-MTC UE in transitioning from RRC_CONNECTED to RRC_IDLE upon receiving a RRC Connection Release message.

FIG. 4 is an exemplary flow diagram of performing a cell selection by a LC-MTC UE in transitioning from RRC_CONNECTED to RRC_IDLE upon receiving a RRC Connection Release message. The LC-MTC UE transitions from a RRC_CONNECTED state 401 to a RRC_IDLE state 402 upon receiving a RRC Connection Release message 403. At step 411, the LC-MTC UE checks whether the redirectedCarrierInfo with indicated frequency is included in the RRC Connection Release message. If step 411 determines yes, the LC-MTC UE moves to step 412 and attempts to select one or more cells with the frequency indicated in the redirectedCarrierInfo. If step 411 determines no, the LC-MTC UE moves to step 413 and determines if the LC-MTC UE can find at least one cell with EUTRA carrier that has LC-MTC support capability. If step 413 determines yes, the LC-MTC UE moves to step 414 and selects one or more cells with the frequency that supports the LC-MTC. If step 413 determines no, the LC-MTC UE moves to step 415 and starts a Stored Information Cell Selection procedure. The Stored Information Cell Selection procedure requires stored information of carrier frequencies and optionally information of cell parameters, such as scrambling codes, from previously received measurement-control information elements. In one embodiment, the stored information includes the carrier frequency as well as the parameter related to the capability of supporting LC-MTC for each carrier frequency. Once the LC-MTC UE has found a suitable cell, the LC-MTC UE shall select it.

In another novel aspect, the LC-MTC support capability is used for cell reselection. The cell, which the LC-MTC UE camps on is the serving cell. The LC-MTC UE performs measurements of neighboring cells to find possible candidate cells for cell reselection. In one novel aspect, before performing measurements of the neighboring cell, the LC-MTC UE selects the frequencies capable of supporting LC-MTC and handles the reselection priorities for the selected frequencies.

In one embodiment, the LC-MTC UE handles the reselection priorities only considering the frequencies capable of supporting LC-MTC. When the absolute priorities of different E-UTRAN frequencies or inter-RAT frequencies are provided to the LC-MTC UE in the system information, in the RRC Connection Release message, or by inheriting from another RAT at inter-RAT cell selection/reselection, the capability of supporting LC-MTC is also provided. In another embodiment, if the LC-MTC UE has no knowledge of any other frequency capable of supporting LC-MTC, the LC-MTC UE assigns the highest priority to the current frequency it camped on that supports LC-MTC and disregards any other priority value allocated to this frequency. In such situation, the highest priority assigned to the frequency is higher than the eight network configured values.

The LC-MTC UE shall only perform cell reselection evaluation for E-UTRAN frequencies and inter-RAT frequencies that are given in system information and for which the LC-MTC UE has a priority provided and capable of supporting LC-MTC. The LC-MTC UE shall not consider any cell that is incapable of supporting LC-MTC as candidate for cell reselection. Thus, the LC-MTC UE performs measurement and executes the cell-reselection evaluation process only for the cells capable of supporting LC-MTC.

Figure 5:
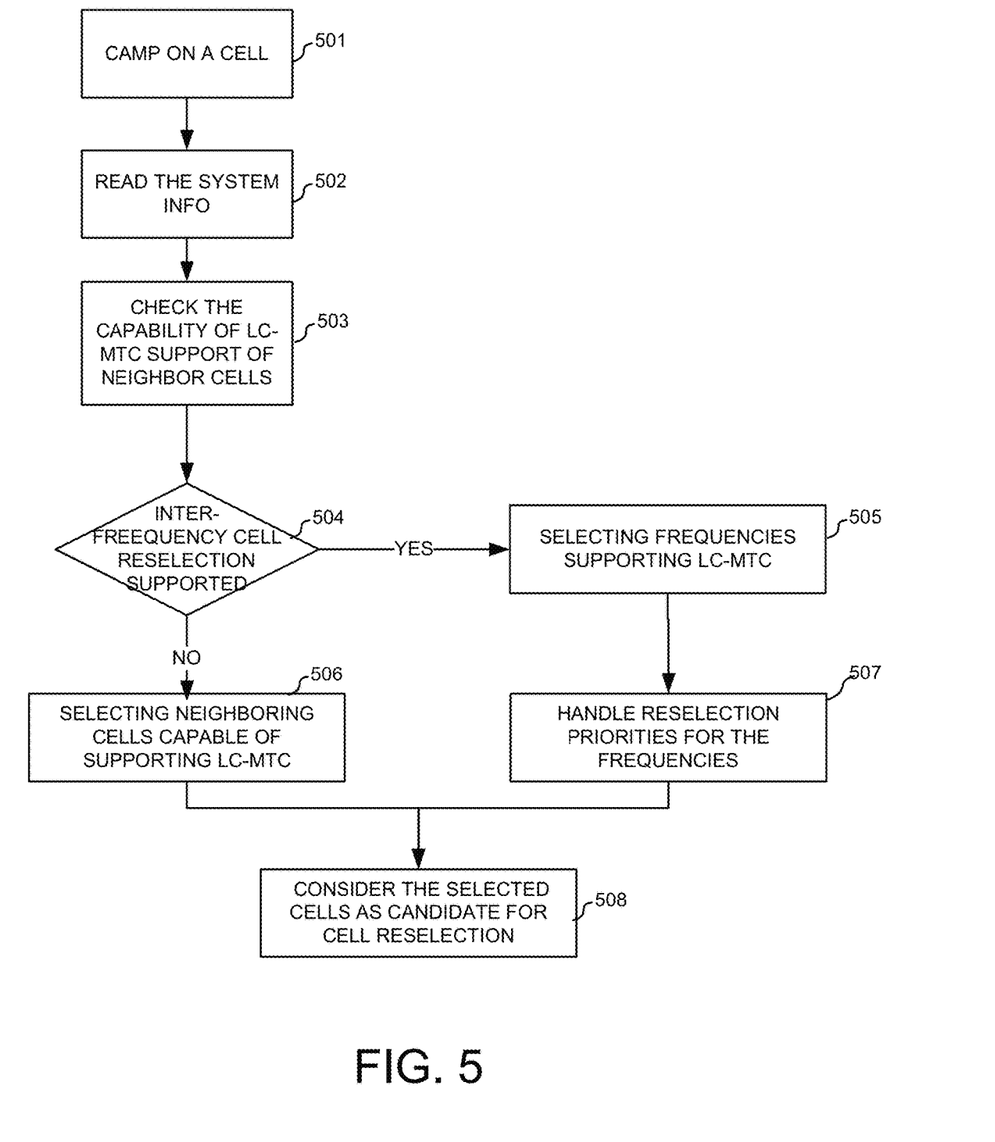
FIG. 5 is an exemplary flow diagram for LC-MTC UE to determine cell accessibilities based on LC-MTC support capability during cell reselection in accordance with embodiments of the current invention.

FIG. 5 is an exemplary flow diagram for LC-MTC to determine cell accessibilities based on LC-MTC support capability during cell reselection in accordance with embodiments of the current invention. After the LC-MTC UE camps on a cell capable of supporting LC-MTC (step 501), it regularly searches for a better cell, which is capable of supporting LC-MTC according to the cell reselection criteria. The LC-MTC UE reads system information from the serving cells (step 502). The LC-MTC UE checks the capability of LC-MTC support of neighbor cells and picks up the neighboring cells, which are capable of supporting LC-MTC (step 503). At 504, the LC-MTC UE determines whether the inter-frequency or inter-RAT cell reselection is supported. If step 504 determines that inter-frequency or inter-RAT cell reselection is supported, the LC-MTC UE moves to step 505 and selects the frequencies that are capable of supporting LC-MTC. The LC-MTC UE moves to step 507 and performs reselection handling to those frequencies. If step 504 determines that that inter-frequency or inter-RAT cell reselection is not supported, the LC-MTC UE moves to step 506 and selects neighboring cells that are capable of supporting LC-MTC. Only those neighboring cells, which are capable of supporting LC-MTC, can be considered as candidate cells for cell reselection. Measurements, as well as the execution of the cell reselection evaluation, are also applied to those neighboring cells. The LC-MTC UE moves from step 506 or step 507 to step 508, where the LC-MTC UE considers those selected cell as candidate cells for cell reselection procedure.

Figure 6:
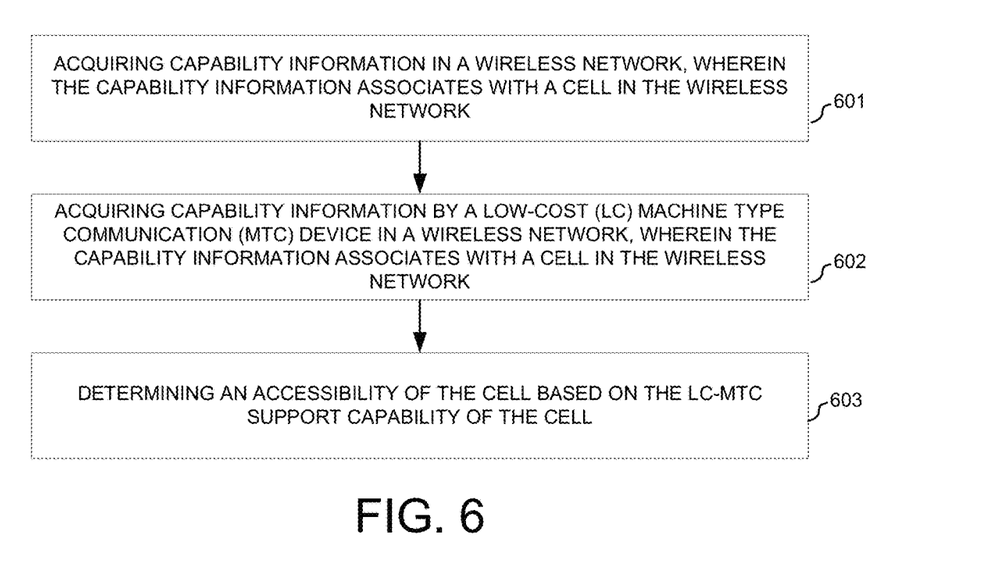
FIG. 6 is an exemplary flow chart of a cell selection process for the LC-MTC UE in accordance with embodiments of the current invention.

FIG. 6 is an exemplary flow chart of a cell selection process for the LC-MTC UE in accordance with embodiments of the current invention. At step 601, the LC-MTC UE acquires capability information in a wireless network, wherein the capability information associates with a cell in the wireless network. At step 602, the LC-MTC UE checks a LC-MTC support capability of the cell based on the acquired capability information. At step 603, the LC-MTC UE determines an accessibility of the cell based on the LC-MTC support capability of the cell.

Figure 7:
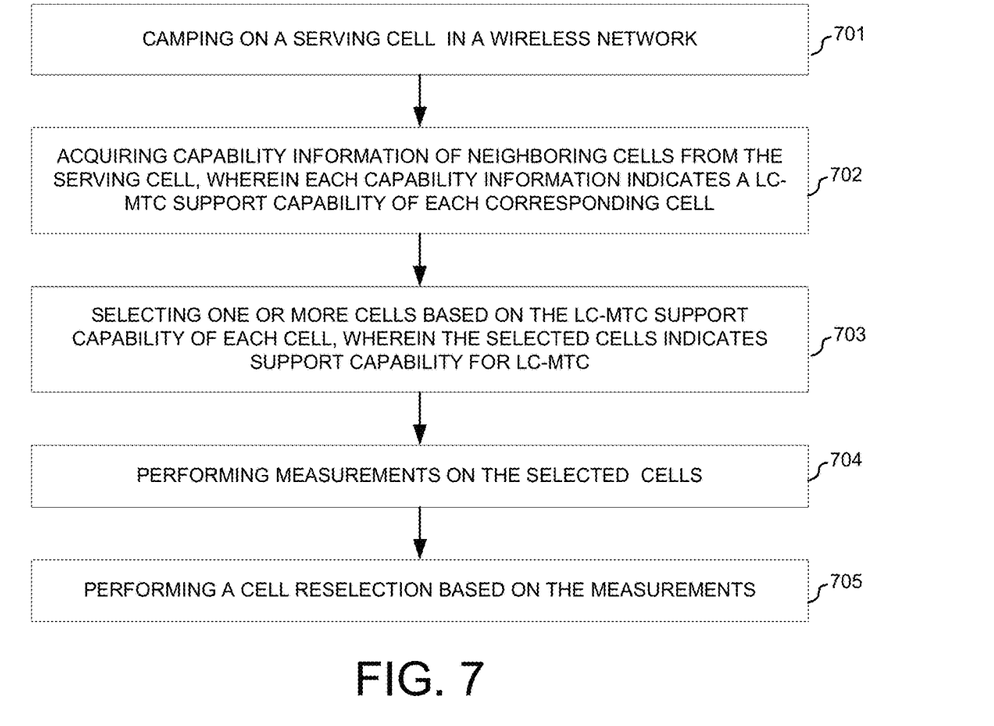
FIG. 7 is an exemplary flow chart of a cell selection process for the LC-MTC UE in accordance with embodiments of the current invention.

FIG. 7 is an exemplary flow chart of a cell selection process for the LC-MTC UE in accordance with embodiments of the current invention. At step 701, the LC-MTC UE camps on a cell in a wireless network. At step 702, the LC-MTC UE acquires capability information of neighboring cells, wherein each capability information indicates a LC-MTC support capability of each corresponding cell. At step 703, the LC-MTC UE selects one or more cells based on the LC-MTC support capability of each cell, wherein the selected cells indicate support capability for LC-MTC. At step 704, the LC-MTC UE performs measurements on the selected cells. At step 705, the LC-MTC UE performs a cell reselection based on the measurements on those selected cells Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   acquiring capability information by a user equipment (UE) in a wireless network, wherein the capability information associates with a cell in the wireless network;
   checking a LC-MTC support capability of the cell based on the acquired capability information;
   determining an accessibility of the cell based on the LC-MTC support capability of the cell;
   transitioning from RRC_CONNECTED to RRC_IDLE after receiving a RRC Connection Release message without a redirectedCarrierInfo;

determining the accessibility of one or more neighboring cells by finding at least one cell with EUTRA carrier capable of supporting LC-MTC and if failed performing a cell selection with a Stored Information Cell Selection procedure; and selecting a second cell to camp on based on the determined accessibility.

2. The method of claim 1, wherein the UE is a low cost (LC) machine type communication (MTC) device.

3. The method of claim 1, wherein the capability information is acquired through one of means comprising: decoding a system information that includes the LC-MTC support capability, decoding a RRC Connection Release message that includes the LC-MTC support capability, and inheriting the LC-MTC support capability from another radio access technology (RAT) during inter-RAT cell selection or reselection.

4. The method of claim 1, wherein the LC-MTC support capability is per cell or per frequency.

5. The method of claim 1, wherein the LC-MTC support capability indicates LC-MTC is supported if the received SystemInformationBlockType1 message includes the IE of category0Allowed.

6. The method of claim 1, wherein the cell is considered barred if the LC-MTC support capability indicates LC-MTC not supported, otherwise, the cell is not considered as barred.

7. The method of claim 6, wherein the cell is not considered as barred further comprising:

determining an access status of the cell, wherein the cell is considered barred if the access status of the cell indicates the cell barred; otherwise camping on the cell and performing an access barring checking procedure when establishing RRC connection, wherein the cell is considered barred if the access barring checking fails, otherwise, the cell is not considered as barred.

8. The method of claim 1, wherein the Stored Information Cell Selection procedure for each carrier frequency includes the information related to the capability of supporting LC-MTC.

9. A method comprising:

camping on a serving cell by a user equipment (UE) in a wireless network;

acquiring capability information of neighboring cells from the serving cell, wherein each capability information indicates a LC-MTC support capability of each corresponding cell;

selecting one or more cells based on the LC-MTC support capability of each cell, wherein the selected one or more cells indicates support capability for LC-MTC;

transitioning from RRC_CONNECTED to RRC_IDLE after receiving a RRC Connection Release message without a redirectedCarrierInfo;

determining the accessibility of one or more neighboring cells by finding at least one cell with EUTRA carrier capable of supporting LC-MTC and if failed performing a cell selection with a Stored Information Cell Selection procedure; and selecting a second cell to camp on based on the determined accessibility.

10. The method of claim 9, wherein the UE is a low cost (LC) machine type communication (MTC) device.

11. The method of claim 9, wherein the neighbor cell capability information that indicates the MTC-LC support capability is provided in the system information of the serving cell.

12. The method of claim 9, wherein the LC-MTC support capability is indicated per frequency or per cell.

13. The method of claim 9, further comprising:

selecting one or more frequencies that is capable of supporting MTC-LC; and selecting the second cell to camp on based on the one or more selected frequencies.

14. A user equipment (UE) comprising:

a transceiver that transmits and receives radio signals in a wireless network;

a low-cost (LC) capability circuit that acquires capability information, wherein the capability information associates with a cell in the wireless network, checks a LC-MTC support capability of the cell based on the acquired capability information, and determines an accessibility of the cell based on the LC-MTC support capability of the cell, performs transitioning from RRC_CONNECTED to RRC_IDLE after receiving a RRC Connection Release message without a redirectedCarrierInfo, determines the accessibility of one or more neighboring cells by finding at least one cell with EUTRA carrier capable of supporting LC-MTC and if failed performing a cell selection with a Stored Information Cell Selection procedure, and selects a second cell to camp on based on the determined accessibility.

15. The UE of claim 14, wherein the LC capability circuit acquires capability information through one of means comprising: decoding a system information that includes the LC-MTC support capability, decoding a RRC Connection Release message that includes the LC-MTC support capability, and inheriting the LC-MTC support capability information from another radio access technology (RAT) during inter-RAT cell selection or reselection.

16. The UE of claim 14, wherein the LC-MTC support capability is per cell or per frequency.

17. The UE of claim 14, wherein the cell is considered barred if the LC-MTC support capability indicates LC-MTC not supported, otherwise, the cell is not considered as barred.

18. The UE of claim 14, further comprising: a cell selection circuit that selects a cell to camp on based on cell accessibilities of one or more cells determined by the LC capability circuit.

19. The UE of claim 14, further comprising: a cell reselection circuit that acquires capability information of neighboring cells, wherein each capability information indicates a LC-MTC support capability of each corresponding cell, selects one or more cells based on the LC-MTC support capability of each cell, wherein the selected one or more cells indicates support capability for LC-MTC, performs measurements on the selected cells, and performs a cell reselection based on the measurements.

* * * * *